United States Patent [19]
Reeves

[11] Patent Number: 6,009,148
[45] Date of Patent: Dec. 28, 1999

[54] PHONE-ACTIVATED EMERGENCY VISUAL SIGNALING SYSTEM WITH LOW POWER CONSUMPTION SIGNAL LIGHT

[76] Inventor: Michael Reeves, 420 S. Cleveland Ave., Bourbonnais, Ill. 60914

[21] Appl. No.: 09/097,921

[22] Filed: Jun. 16, 1998

[51] Int. Cl.$^6$ ............................................. H04M 11/04
[52] U.S. Cl. ........................... 379/37; 379/386; 379/396; 340/331
[58] Field of Search ................... 379/36–38, 40, 379/45, 49, 51, 102.01, 188, 199, 200, 354, 386, 396; 340/331, 332

[56] References Cited

U.S. PATENT DOCUMENTS

| | | | |
|---|---|---|---|
| Re. 34,677 | 7/1994 | Ray et al. .................................. | 379/37 |
| 4,748,706 | 6/1988 | Morgan et al. ........................... | 379/37 |
| 4,931,780 | 6/1990 | LaMont et al. ........................... | 379/37 |
| 4,935,951 | 6/1990 | Robinson et al. ........................ | 379/37 |
| 4,993,058 | 2/1991 | McMinn et al. .......................... | 379/37 |
| 5,012,507 | 4/1991 | Leighton et al. ......................... | 379/37 |
| 5,621,379 | 4/1997 | Collins ...................................... | 379/37 |
| 5,673,304 | 9/1997 | Connor et al. ............................ | 379/38 |
| 5,815,068 | 9/1998 | Vadseth .................................... | 340/332 |

*Primary Examiner*—Wing F. Chan
*Attorney, Agent, or Firm*—Terrance L. Siemens

[57] ABSTRACT

The present invention features a self-contained, programmable, telephone-activated emergency visual alert system. Low energy consumption LED visual alert "strobe" signal is directly powered from the inventive control unit. Multiple emergency telephone numbers may be programmed into the control unit making the inventive system highly effective for use in areas without standard "911" emergency dispatch service. In an alternate embodiment, the visual indicator may be located some distance away from the controller unit and be activated by means of an rf or other wireless control link. A small, inexpensive battery at the remote indicator may power the receiver and indicating lamp for long periods of time without the need for battery replacement. Programmable integrated circuits form the basis of the control circuitry allowing low component count, low power consumption and, ultimately, low cost and long term, reliable operation. An audible alert device such as a siren may also be attached to and activated by the inventive system.

16 Claims, 4 Drawing Sheets

PHONE-ACTIVATED EMERGENCY VISUAL SIGNALING SYSTEM WITH LOW POWER CONSUMPTION SIGNAL LIGHT

BACKGROUND OF THE INVENTION

1. Field of the Invention

The present invention relates to emergency visual locator systems. More particularly, the invention comprises a telephone-activated, high-intensity light for installation outside a structure to aid emergency personnel in locating the site of the emergency.

2. Description of the Prior Art

Emergency visual signaling systems for activation by a telephone are known. Typical examples of these prior-art systems are disclosed in U.S. Pat. No. 4,993,058, issued to Edward W. McMinn, et al. on Feb. 12, 1991; RE 34,677, issued to Donald K. Ray et al. on Jul. 26, 1994; 5,621,379, issued to Sean Collins on Apr. 15, 1997; and 5,748,706, issued to Samuel D. Morgan et al. on May 5, 1998, all relating to phone-activated, visual signaling systems.

Specifically, McMinn discloses an illuminated house number display incorporating a high-intensity, conventional strobe-type lamp. The McMinn apparatus works only with the dialed number sequence 9-1-1 or, for test purposes, the four-digit dialed number sequence #-9-1-1. The power for the strobe lamp must be provided by the circuitry and, because of the large amount of energy required by conventional strobe lamps, any emergency battery backup would be both expensive and bulky. In contradistinction, the inventive phone-activated visual emergency signal system features multiple, programmable digit sequences (phone numbers) to which the unit will respond. These programmable sequences are easily installed in the inventive control system using a learn mode of operation. The multiple number sequences are particularly useful in areas which have not yet implemented a 911 emergency dispatch system and multiple phone numbers are required to selectively summon fire, police and/or medical emergency aid. The controller of the inventive system responding to any one of the pre-programmed numbers. In addition, the indicating signal for use with the inventive system uses a high-efficiency, LED-based strobe signal requiring substantially less power than conventional strobe-type lamps. This allows a compact and inexpensive battery backup system to maintain the visual signal in operation in the event of a power failure. Also, in an alternate embodiment of the inventive system, a radio-frequency (rf) link is employed to activate the visual signal which may be located at a point remote from the structure (e.g., at a mailbox by the road away from a rural dwelling). A small, inexpensive battery at the remote signal will power the receiver and activate the strobe signal lamp for extended periods of time. The inventive controller also provides an optional audible alert, for instance a siren, which is not taught by McMinn.

Ray, et. al. teach another phone-activated emergency visual signal responsive to the dialing of the 911 emergency telephone number. The system is only responsive only to the 911 code which precludes its use in areas without 911 service. Conventional, analog DTFM-decoding and control circuitry are used throughout the device resulting in a relatively expensive, bulky and power-consuming device. The inventive control system, on the other hand, employs digital circuitry based on a programmable logic chip which results in low component count, lower power consumption and ultimately, lower initial cost and longer, more trouble-free life.

Collins teaches still another phone-activated, visual emergency signal. The Collins apparatus utilizes a two-way interface wherein the actual display is initiated and configured by emergency personnel receiving a 911 or similar emergency call. The Collins display may exhibit different colors and/or flashing display patterns based on the nature of the emergency. The inventive system differs significantly in that no remote, human-initiated activation is required. Nor does the inventive system rely on expensive, complex, multi-lamp displays or complicated controls including a two-way interface. The inventive system uses a low-power, LED visual alert strobe lamp which may be located at a point remote from the initiating phone and activated by means of a wireless interface.

Finally, Morgan, et al. teach an emergency visual display activation system for use in cooperation with a telephone. The Morgan system recognizes only the 9-1-1 sequence or its inverse, 1-1-9 and, unlike the inventive system, has no provision for programming multiple, diverse telephone numbers. Morgan, et al. utilize the popular "X10" carrier current control system for activating the alert signal lamp. This system is totally dependent on the presence of AC line voltage unlike the system of the instant invention which operates effectively from battery power and is not dependent upon the AC lines for transmission of its control signals.

In each one of these prior art inventions, a phone-activated, visual alert signal is described. However, none of the above inventions and patents, taken either singly or in combination, is seen to suggest or describe the instant invention as claimed.

SUMMARY OF THE INVENTION

The present invention features a self-contained, programmable, telephone-activated emergency visual alert system. A low-energy consumption LED visual alert strobe signal is directly powered from the inventive control unit. Multiple emergency telephone numbers may be programmed making the controller of the present invention highly effective for use in areas without the standard "911" emergency dispatch service. In an alternate embodiment, the visual indicator may be located some distance away from the controller unit and be activated by means of an rf or other wireless control link. A small, inexpensive battery at the remote indicator will power the receiver and visual alert signal for long periods of time without the need for battery replacement. Programmable integrated circuits form the basis of the control circuitry allowing a low component count, low power consumption and, ultimately, low cost and long term, reliable operation.

Accordingly, it is a principal object of the invention to provide a programmable, low energy consuming visible emergency indicator for use with a telephone system.

It is another object of the invention to provide a visual alert system automatically activated by the dialing of more than one different, predetermined emergency telephone number.

It is a further object of the invention to provide a visual indicator that is directly driven by the control circuitry and which does not depend on the presence of AC line current for operation.

Still another object of the invention is to provide a visual alert controller and indicator which is readily powered by an inexpensive, small battery backup unit.

It is a further object of the invention to provide a connection between the visual alert controller and the indicating device by means of low-voltage class wiring.

Another object of the invention is to provide a unit which may be safely, quickly and easily installed by non-technical personnel.

An additional object of the invention is to provide a telephone-activated emergency visual alert signal system wherein the visual indicator lamp may be located remotely from the control unit and activated by a wireless control link.

It is a still further object of the invention to provide an optional audible alert signal to operate simultaneous with the visual alert signal.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
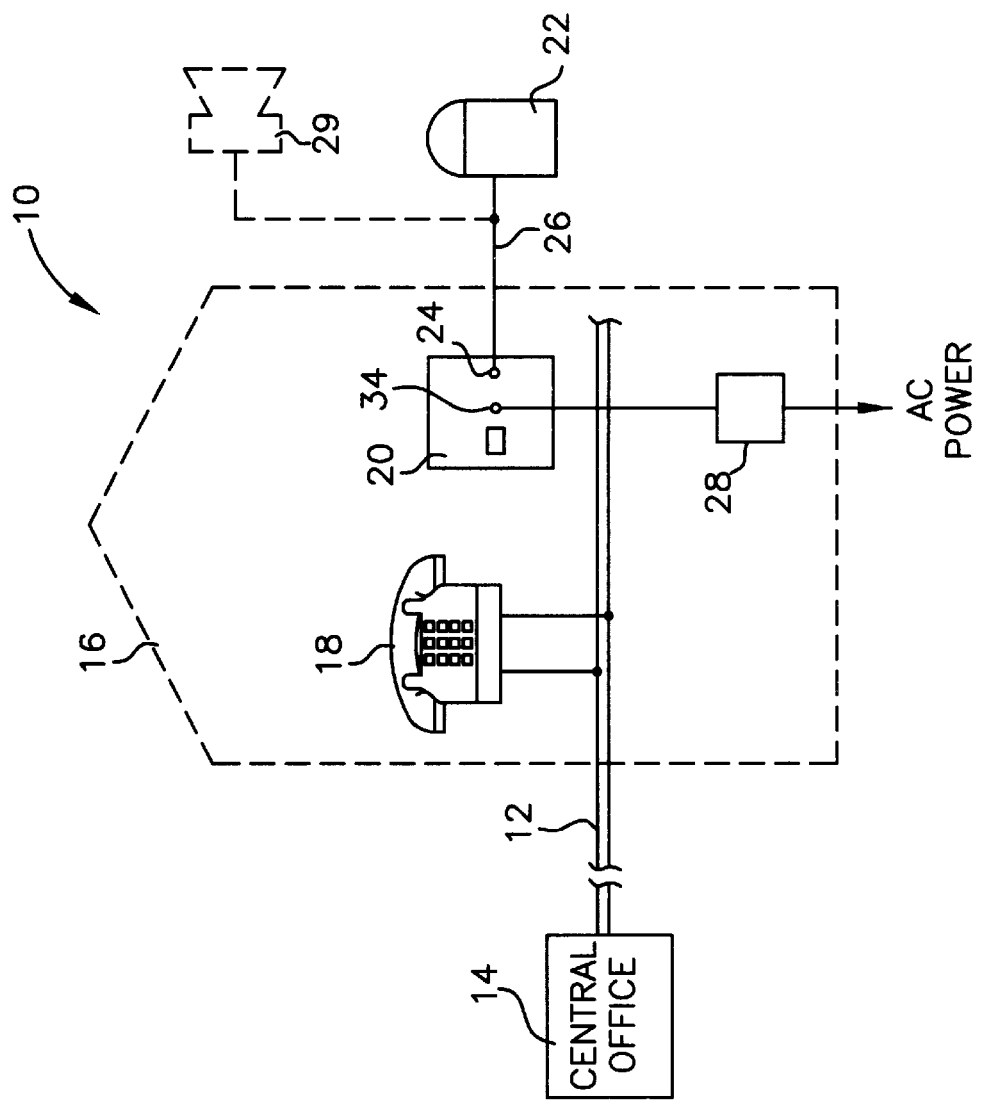
FIG. 1 is a functional block diagram of the emergency visual alert system of the present invention.

Referring first to FIG. 1, there is shown a functional block diagram of the telephone-activated, emergency visual alert indicating system of the present invention, generally at reference number 10. A telephone line 12, connected to telephone company central office switching equipment 14 is shown entering a structure 16. One or more conventional telephone instruments 18 are attached to telephone line 12 in a manner well known to those skilled in the art, typically by means of a conventional RJ-11 plug/socket arrangement (not shown). Control unit 20 is also connected to telephone line 12, also typically using a RJ-11 connector. It will be obvious to those skilled in the art that any number of connection strategies between one or more telephone instruments 18 and/or control unit 20 could be utilized and these connection strategies form no part of the present invention. A visual strobe indicator 22, generally located outside of structure 16 is connected to jack 24 of control unit 20 by means of two-conductor cable 26. Other connection strategies using differing connectors and/or different cables will be obvious to those skilled in the art. It is possible to utilize a single-conductor cable and use the earth, a water pipe, or other conductive member for a return path between visual indicator 22 and control unit 20. Operating voltage, typically 12 volts DC, is supplied to control unit 20 from a standard, external power pack 28 connected to the AC power in structure 16 through connector 34. It will be obvious to those skilled in the art that other powering arrangements could be designed to meet other operating requirements or environments. For example, the function of power pack 28 could be incorporated within the enclosure of control unit 20.

An optional audible alarm 29, such as a siren, may also be energized simultaneously with visual alert indicator 22 through output connector 24.

Figure 2:
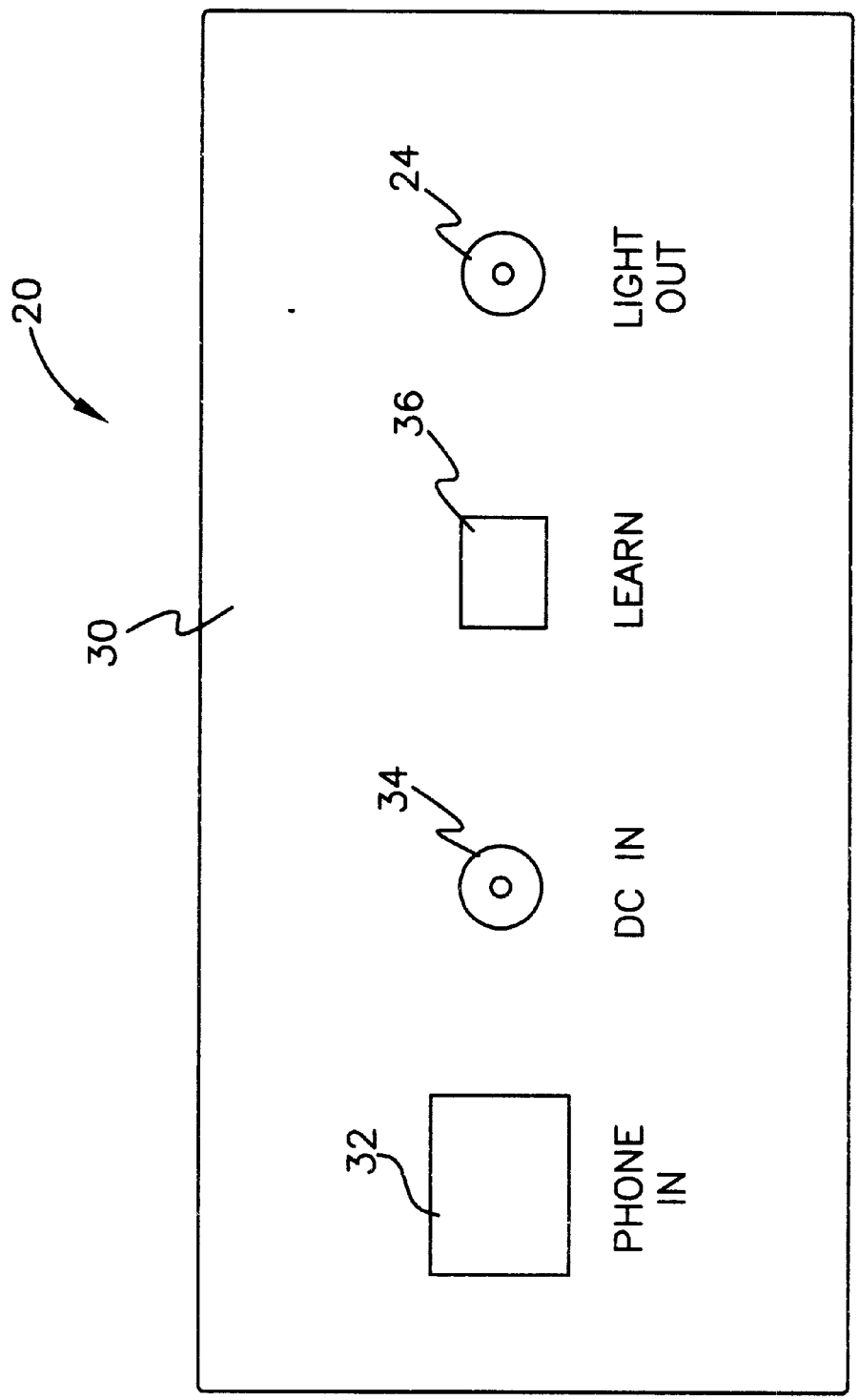
FIG. 2 is a schematic view of the face of the control unit of the invention.

Referring now to FIG. 2, there is shown a typical view of the face 30 of control unit 20. An RJ-11 or similar jack 32 allows for connection of control unit 20 to telephone line 12 (FIG. 1). The inventive control unit 20 is powered by an externally-supplied DC voltage, typically 12 volts, applied to control unit 20 through voltage connector 34. A standard power pack (not shown) plugged into a duplex wall outlet (not shown) is typically used to provide the operating DC voltage to control unit 20.

A visual indicator strobe lamp 22 (FIG. 1) is connected to control unit 20 at jack 24 on control unit 20. Indicator lamp or strobe 22 is a high-intensity LED device which is totally powered by control unit 20. A device such as catalog number 300X as supplied by VISTA LITE has been found satisfactory for use in the application. Because visual indicator 22 is a low-voltage device, there is no need to run line voltage between control unit 20 and visual indicator 22. This abrogates the need for wiring meeting an electric code, or in some localities, the hiring of a licensed electrician to install the wiring between control unit 20 and visual indicator 22. In the preferred embodiment, Visual indicator 22 is typically supplied with 50 feet of wire equipped with a connector mating with jack 24 on control unit 20 so that installation is greatly simplified.

A "learn" switch 36 is also located on face 30 of control unit 20 provides for programming control unit 20 with up to four telephone numbers to which control unit 20 will respond when any of the numbers is dialed from any telephone 18 (FIG. 1) connected to telephone line 12. The operation of learn switch 36, a push-button switch in the embodiment chosen for purposes of disclosure, will be described in more detail hereinbelow.

Figure 3:
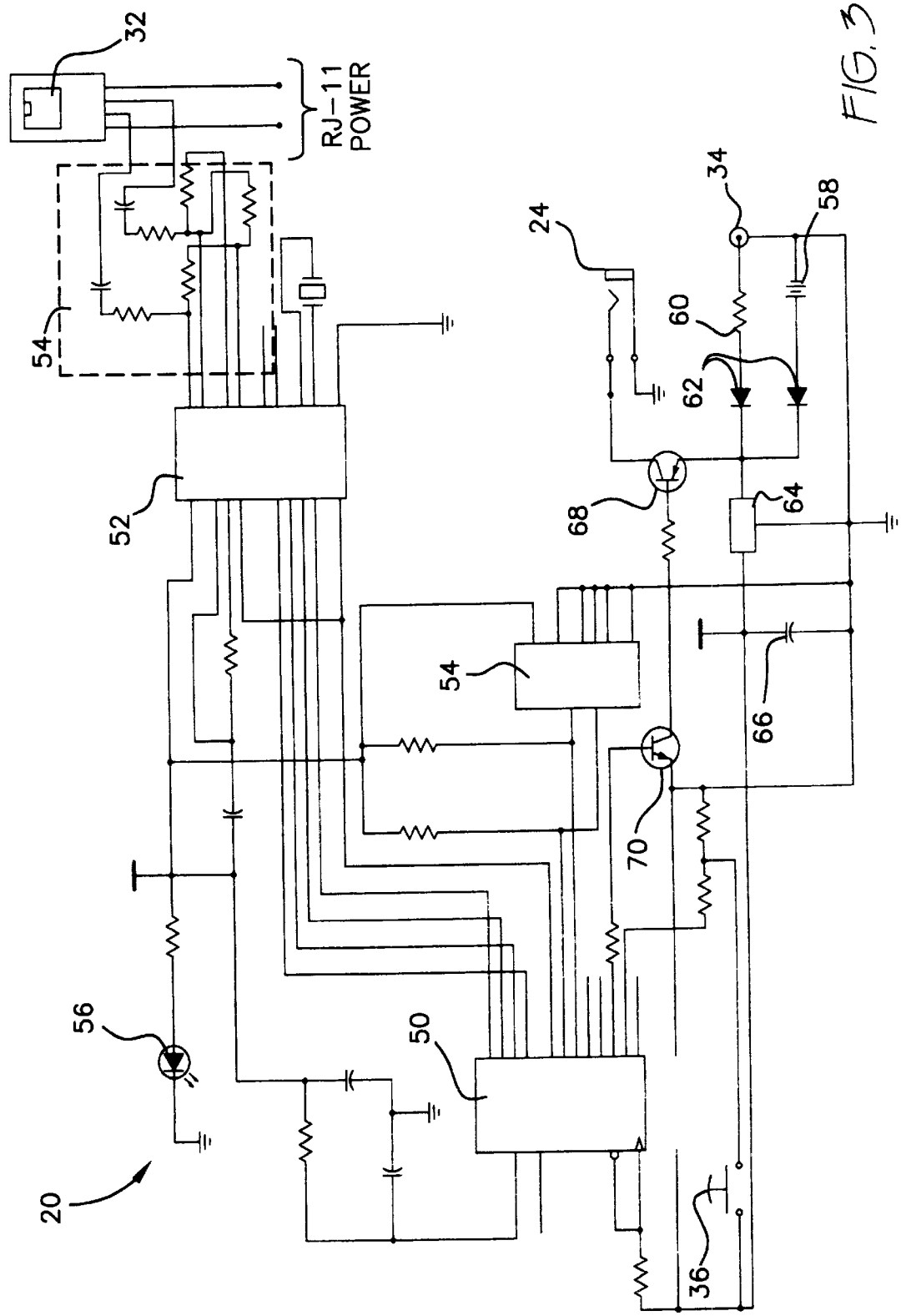
FIG. 3 is a schematic diagram of the circuit of the preferred embodiment of the invention.

Referring now to FIG. 3, there is shown a schematic diagram of control unit 20. The heart of the inventive control system is a low-power, 8-bit, field-programmable microcontroller 50 such as the PIC16C54 device manufactured by Microchip Technology. The PIC16C54 is readily programmable and features a UV-erasable, on-board EPROM. A widely-known, readily available macro assembler language makes the device easily programmable. It will be obvious to those skilled in the circuit design art that other micro controllers could easily be substituted for the chosen device.

A DTMF receiver 52 such as the MT8870D device manufactured by Mitel provides the dialed-number decoding function. DTMF receiver 52 is connected to telephone line input connector 32 through appropriate isolation and signal conditioning circuitry 54. The outputs of DTMF receiver 52 are connected to inputs of micro controller 50. The inventive controller is designed to bridge a standard telephone line 12 (FIG. 1) and monitor any activity thereon. This means that whenever the central office equipment 14 (FIG. 1) at the telephone company senses an "off hook" status of the telephone line 12 (i.e., any phone 18 on telephone line 12 has been lifted from its cradle), controller 20 is alerted and is ready to receive DTMF signals dialed from any phone 18 on telephone line 12.

"Learn" switch 36 connected to micro controller 50 places micro controller 50 in a programmable mode which allows multiple telephone numbers to be inserted into a dynamic memory device 54. In the embodiment chosen for purposes of disclosure, dynamic memory device 54 is a catalog number 24C02 dynamic RAM chip manufactured by CSI. When one of the learned telephone numbers stored in memory device 54 is dialed and micro controller 50 is in normal operating mode (not learn mode), control unit 20 will respond and activate visual indicator 22 and optional audible alert device 29, if present.

An LED or similar indicator 56 may be included locally within control unit 20. LED 56 is illuminated when one of the learned emergency telephone numbers is dialed and provides local verification of the operation of control unit 20.

Power for control unit 20 is normally provided through connector 34. However, because the RJ-11 connectors typically utilized for telephone wiring are 4-conductor devices and normal telephone wiring only utilizes two conductors (typically red and green), the remaining, two unused conductors of RJ-11 connector 32 (typically yellow and black) could be utilized to supply the DC operating power to control unit 20 in lieu of jack 34. An internal, rechargeable battery pack 58 is connected to power input connector 34 through current-limiting resistor 60 and diodes 62, If the unused conductors are employed to conduct power, the two unconnected conductors shown projecting from RJ-11 connector 32 would extend to jack 34 and hence to battery pack 58. Diodes 62 insure that the correct polarity DC voltage is applied to battery pack 58 while resistor 60 limits the charge current to the battery and the remainder of control unit 20's circuitry. Battery pack 58 consists of eight 1.5 volt AA size rechargeable batteries. It will be obvious that numerous other battery sizes/combinations well known to those skilled in the art could also be used. A solid-state voltage regulator 64 and capacitor 66 complete the power supply section of control unit 20.

Output connector 24 is connected to the power supply by means of switching transistor 68. The base of transistor 68 is connected to an output of micro controller 50 through second transistor 70 so that visual indicator 22 (FIG. 1) may be provided power through transistor 68 upon command from micro controller 50.

Figure 4:
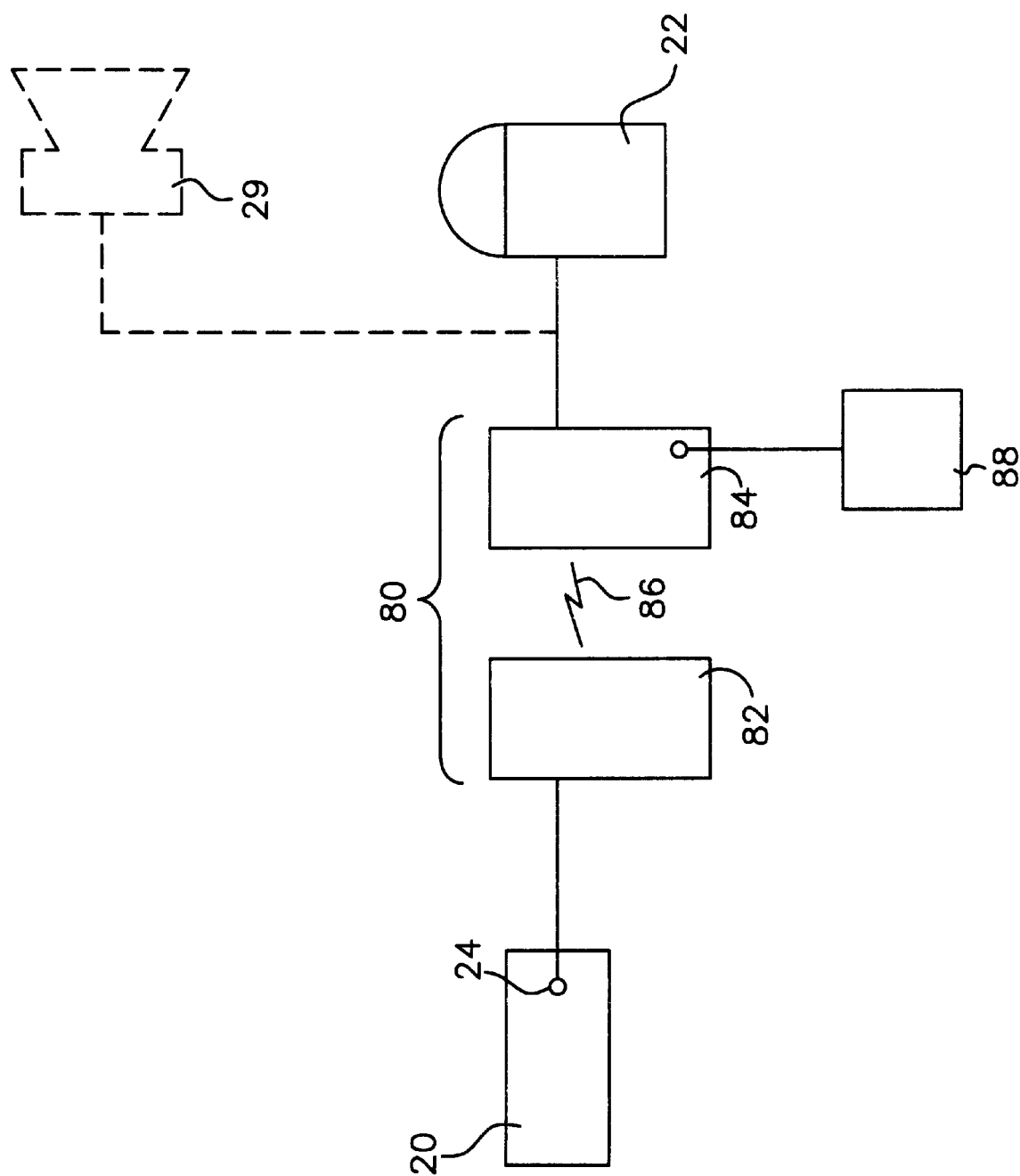
FIG. 4 is a functional block diagram of an alternate embodiment of the invention featuring wireless control of the visual indicator lamp.

Referring now to FIG. 4, there is shown a functional block diagram of an alternate embodiment of the inventive emergency visual indicator system. In this embodiment, visual indicator 22 may be located at a point remote from control unit 20 and be activated by means of a wireless interface 80 consisting of a transmitter 82 which is coupled to output connector 24 of control unit 20. A remote receiver 84 is operatively connected to transmitter 82 by a radio frequency (rf) link 86. Many other transmission modalities could be employed such as light beam (e.g., infrared), ultrasonic beam, carrier current link via power lines, or microwave-frequency rf. Receiver 84 is adapted to receive an activating signal from wireless link 86 and remotely activate visual indicator 22. Either an external or internal battery 88 powers receiver 84 and provides the necessary power for visual indicator 22. An inexpensive, readily available 6-volt lantern-type battery has been found to provide satisfactory operation for typically one year before replacement was required. Optional audible alert device 29 may also be activated by receiver 84. It will be obvious that battery 88 may be located either inside or outside receiver 84. It should also be obvious that the components of transmitter 82 may be included within control unit 20 or may be configured as a stand-alone unit for external connection to output connector 24 of control unit 20.

It is to be understood that the present invention is not limited to the embodiments described above, but encompasses any and all embodiments within the scope of the following claims.

I claim:

1. A visual signaling apparatus for connection to a telephone line, comprising:
    a) a control unit operatively connected to said telephone line, said control unit being adapted to provide an output signal when a predetermined telephone number is dialed by a telephone also operatively connected to said telephone line, said control unit comprising a field-programmable micro controller having a dynamic memory device, and a digital DTMF receiver connected to the telephone line through isolation and signal conditioning circuitry;
    b) a visual signal means operatively connected to said control unit, comprising a high intensity, low voltage LED device, said visual signaling means being responsive to and powered by said output of said control unit;
    an internal, rechargeable battery adapted to provide back-up power to said control unit; and
    an RJ-11 connector having a low voltage class first conductor, a low voltage class second conductor, a low voltage class third conductor, and a low voltage class fourth conductor, wherein said first conductor and said second conductor are communications conductors connected to the telephone line and said third conductor and said fourth conductor are connected to conduct power to said internal, rechargeable battery and ultimately to said LED device.

2. The visual signaling apparatus for connection to a telephone line as recited in claim 1 wherein said visual signaling means comprises a strobe device.

3. The visual signaling apparatus for connection to a telephone line as recited in claim 2, further comprising an audible alarm operatively connected to said output of said control unit.

4. The visual signaling apparatus for connection to a telephone line as recited in claim 3, wherein said audible alarm comprises a siren.

5. The visual signaling apparatus for connection to a telephone line as recited in claim 2, said control unit further comprising an internal LED operatively connected to said output to provide a local indication of the operation of said control unit.

6. The visual signaling apparatus for connection to a telephone line as recited in claim 1, wherein said control unit further comprises a socket adapted to receive a plug attached to said low-voltage class first conductor, second conductor, third conductor, and fourth conductor.

7. The visual signaling apparatus for connection to a telephone line as recited in claim 2, wherein said predetermined telephone number comprises at least three predetermined telephone numbers.

8. The visual signaling apparatus for connection to a telephone line as recited in claim 7, wherein control unit comprises programmable memory and said at least three predetermined telephone numbers are stored within said programmable memory.

9. The visual signaling apparatus for connection to a telephone line as recited in claim 8, wherein said control unit comprises a learn mode allowing at least three predetermined telephone numbers to be entered into said programmable memory.

10. The visual signaling apparatus for connection to a telephone line as recited in claim 9, wherein said at least three predetermined telephone numbers are entered into said programmable memory by dialing each of said at least three predetermined numbers at said at least one telephone connected to said telephone line while said control unit is in said learn mode.

11. The visual signaling apparatus for connection to a telephone line as recited in claim 1, further comprising:
   c) a wireless control link operatively connected to said output of said control unit for generating and broadcasting a control signal responsive to said output; and
   d) a receiver adapted to receive said broadcast control signal and to activate said visual signaling device connected to said receiver, said receiver further comprising a power source for providing both operating power to said receiver and power to said visual signaling device.

12. The visual signaling apparatus for connection to a telephone line as recited in claim 11 wherein said broadcast control signal comprises a radio frequency signal.

13. The visual signaling apparatus for connection to a telephone line as recited in claim 12 further comprising an audible alert device operatively connected to said received control signal from said receiver.

14. The visual signaling apparatus for connection to a telephone line as recited in claim 13 wherein said audible alert device is a siren.

15. The visual signaling apparatus for connection to a telephone line as recited in claim 11 wherein said broadcast control signal comprises a sonic signal.

16. The visual signaling apparatus for connection to a telephone line as recited in claim 11 wherein said broadcast control signal comprises a light signal.

* * * * *